United States Patent
Knight et al.

(10) Patent No.: US 8,422,203 B2
(45) Date of Patent: Apr. 16, 2013

(54) LOW-RESISTANCE TELECOMMUNICATIONS POWER DISTRIBUTION PANEL

(75) Inventors: Paul A. Knight, Spokane, WA (US); Bryan Joseph Kioski, Spokane, WA (US)

(73) Assignee: Telect Inc., Liberty Lake, WA (US)

( * ) Notice: Subject to any disclaimer, the term of this patent is extended or adjusted under 35 U.S.C. 154(b) by 279 days.

(21) Appl. No.: 12/884,499

(22) Filed: Sep. 17, 2010

(65) Prior Publication Data

US 2012/0069494 A1    Mar. 22, 2012

(51) Int. Cl.
H02B 1/18    (2006.01)
H02B 1/20    (2006.01)
H01R 43/00   (2006.01)

(52) U.S. Cl.
USPC .......... 361/630; 361/637; 361/627; 361/628; 361/640; 361/642; 361/648; 29/825

(58) Field of Classification Search ............ 361/630, 361/637, 627, 628, 640, 642, 648; 29/825
See application file for complete search history.

(56) References Cited

U.S. PATENT DOCUMENTS

| | | | |
|---|---|---|---|
| 4,604,602 A | | 8/1986 | Borzoni |
| 5,726,852 A | * | 3/1998 | Trifiletti et al. ............... 361/115 |
| 5,844,763 A | * | 12/1998 | Grace et al. .................... 361/111 |
| 6,086,388 A | | 7/2000 | Sloey et al. |
| 6,160,699 A | * | 12/2000 | Gibson et al. ................. 361/643 |
| 6,317,312 B1 | * | 11/2001 | Hashizawa et al. ........... 361/642 |
| 6,358,099 B1 | | 3/2002 | Kolody et al. |
| 6,396,380 B1 | * | 5/2002 | Girke et al. .................... 337/189 |
| 6,456,203 B1 | * | 9/2002 | Schomaker et al. .......... 340/638 |
| 6,530,811 B1 | | 3/2003 | Padulo et al. |
| 6,731,507 B2 | * | 5/2004 | Varghese et al. .............. 361/725 |
| 6,826,036 B2 | * | 11/2004 | Pereira .......................... 361/624 |
| 6,882,530 B2 | * | 4/2005 | Cyphers et al. ............... 361/829 |
| 6,947,287 B1 | * | 9/2005 | Zansky et al. ................. 361/731 |
| 7,005,996 B2 | * | 2/2006 | Cabrera et al. ................ 340/639 |
| 7,400,493 B2 | * | 7/2008 | Ewing et al. .................. 361/623 |
| 7,414,828 B2 | | 8/2008 | Birner |
| 7,440,262 B2 | * | 10/2008 | Coffey et al. ................. 361/627 |
| 7,457,106 B2 | * | 11/2008 | Ewing et al. .................. 361/623 |
| 7,585,034 B2 | * | 9/2009 | Cabrera et al. ................ 312/350 |
| 7,675,739 B2 | | 3/2010 | Ewing et al. |
| 7,839,623 B2 | * | 11/2010 | Coffey et al. ................. 361/624 |
| 8,014,131 B2 | * | 9/2011 | Hudgins et al. ............... 361/637 |

* cited by examiner

*Primary Examiner* — Anatoly Vortman
(74) *Attorney, Agent, or Firm* — Lee & Hayes, PLLC

(57) ABSTRACT

A low-resistance telecommunications power distribution panel provides a lower electrical resistance than traditional telecommunications power distribution panels, where the lower electrical resistance provides a reduced amount of waste heat. The low-resistance telecommunications power distribution panel may comprise a single unitary metal busbar configured to directly interconnect a power input cable to a plurality of fuse holders. A plurality of single unitary metal strips may directly connect to each fuse holder, each single unitary metal strip configured to directly connect to a power output lead. A single unitary metal return busbar may directly connect a return input to a plurality of return outputs.

21 Claims, 9 Drawing Sheets

800 ↘

```
┌─────────────────────────────────────┐
│ CONNECT A SINGLE UNITARY METAL BUSBAR TO A │
│        POWER INPUT LUG              │
│              802                    │
└─────────────────────────────────────┘
                  ↓
┌─────────────────────────────────────┐
│ CONNECT A SINGLE UNITARY METAL STRIP TO A │
│        POWER OUTPUT LUG             │
│              804                    │
└─────────────────────────────────────┘
                  ↓
┌─────────────────────────────────────┐
│   CONNECT A SINGLE UNITARY METAL RETURN   │
│ BUSBAR TO A RETURN OUTPUT LUG AND A RETURN │
│              INPUT LUG              │
│                806                  │
└─────────────────────────────────────┘
                  ↓
┌─────────────────────────────────────┐
│  ELECTRICALLY COUPLE A FUSE WITH THE SINGLE │
│  UNITARY METAL BUSBAR AND THE SINGLE UNITARY │
│              METAL STRIP            │
│                808                  │
└─────────────────────────────────────┘
```

FIG. 8

LOW-RESISTANCE TELECOMMUNICATIONS POWER DISTRIBUTION PANEL

TECHNICAL FIELD

This application relates to low-resistance telecommunications power distribution systems and components thereof.

BACKGROUND

Telecommunications processes, equipment and devices consume large amounts of power primarily due to ever increasing customer demands for digital communications versus analog communications. With the shift from analog communications equipment to digital communications equipment in the telecommunications network, the design requirements for power distribution systems have changed.

The design of power distribution systems is heavily regulated by legacy specifications. One such legacy specification provides that secondary power distribution systems (e.g., buses, cables, and power protection devices) provide up to a 2 volt drop between components, which ensures secondary power distribution systems are not overloaded. In view of the legacy specifications, secondary power distribution systems are optimized for manufacturability and cost. Specifically, legacy specifications have driven the designing of secondary power distribution system components to meet the maximum 2 volt drop between components, while utilizing the least amount of copper in an effort to reduce material costs. For example, the sizes of cables and buses are optimized based on the investment of copper to provide the maximum 2 volt drop between a battery bus and the loads. This ensures power distribution systems operate to desired levels and that cables are not overloaded. While legacy specifications regulating safe thermal levels of power distribution systems have remained unchanged for the past few decades, the cost of copper and power have changed. Accordingly there remains a need in the art for high wattage digital telecommunication power distribution equipment that operates to the desired levels with a lower resistance and thus a reduced amount of waste heat.

SUMMARY

A low-resistance telecommunications power distribution panel is provided to distribute power more efficiently based at least in part on the cost of copper and power, while seamlessly integrating with existing telecommunications equipment form factors. In one example, a chassis comprises a single unitary metal busbar and a plurality of single unitary metal strips connecting circuit inputs and outputs. Both the single unitary metal busbar and the plurality of single unitary metal strips are arranged from the first portion to the second portion of the chassis. The single unitary metal busbar is configured to directly connect to a power input lug disposed proximate to the second portion and directly interconnect with individual input connections of a plurality of fuse holders arranged along the first portion. Each of the plurality of single unitary metal strips is configured to directly interconnect with individual output connections of the plurality of fuse holders arranged along the first portion and individual power output lugs disposed proximate to the second portion.

In another example, a low-resistance telecommunications power distribution panel may include a single unitary metal busbar directly interconnected with the individual input connections of the plurality of fuse holders arranged along the first portion of the chassis via a plurality of connector tabs. Each of the connector tabs having a first end directly fastened to the single unitary metal busbar and a second end opposite the first end soldered to the input connection.

In another example, a low-resistance telecommunications power distribution panel may include a single unitary metal busbar directly interconnected with the individual input connections of the plurality of fuse holders arranged along the first portion of the chassis via a plurality of connector tabs formed integral with the metal busbar. Here, each connector tab has a distal end that may be directly fastened to a quick disconnect mechanism connected to each input of the fuse holders. Alternatively, each of the distal ends may be soldered to each input of the fuse holders.

In yet another example, a user may choose to populate a telecommunications chassis with a low-resistance telecommunications power distribution panel. The user may choose to connect the single unitary metal busbar arranged from the first portion to the second portion opposite the first portion of the low-resistance telecommunications power distribution panel to a power input lug disposed proximate to the second portion. In addition to connecting the power input lug directly to the single unitary busbar, the user may also choose to connect the single unitary metal strip arranged from the first portion to the second portion opposite the first portion to a power output lug disposed proximate to the second portion. The user may further choose to electrically couple a fuse with the single unitary metal busbar and the single unitary metal strip. Here, the fuse may be electrically coupled with the single unitary metal busbar and the single unitary strip via a fuse holder arranged in the first portion of the low-resistance telecommunications power distribution panel. The fuse holder having an input connection and an output connection, and wherein the single unitary busbar is interconnected with the input connection and the single unitary metal strip is directly connected to the output.

BRIEF DESCRIPTION OF THE DRAWINGS

The detailed description is described with reference to the accompanying figures. The use of the same reference numbers in different figures indicates similar or identical items.

FIG. 8 is a flow diagram that illustrates an exemplary process of using a low-resistance telecommunications power distribution panel.

DETAILED DESCRIPTION

Overview

Figure 1:
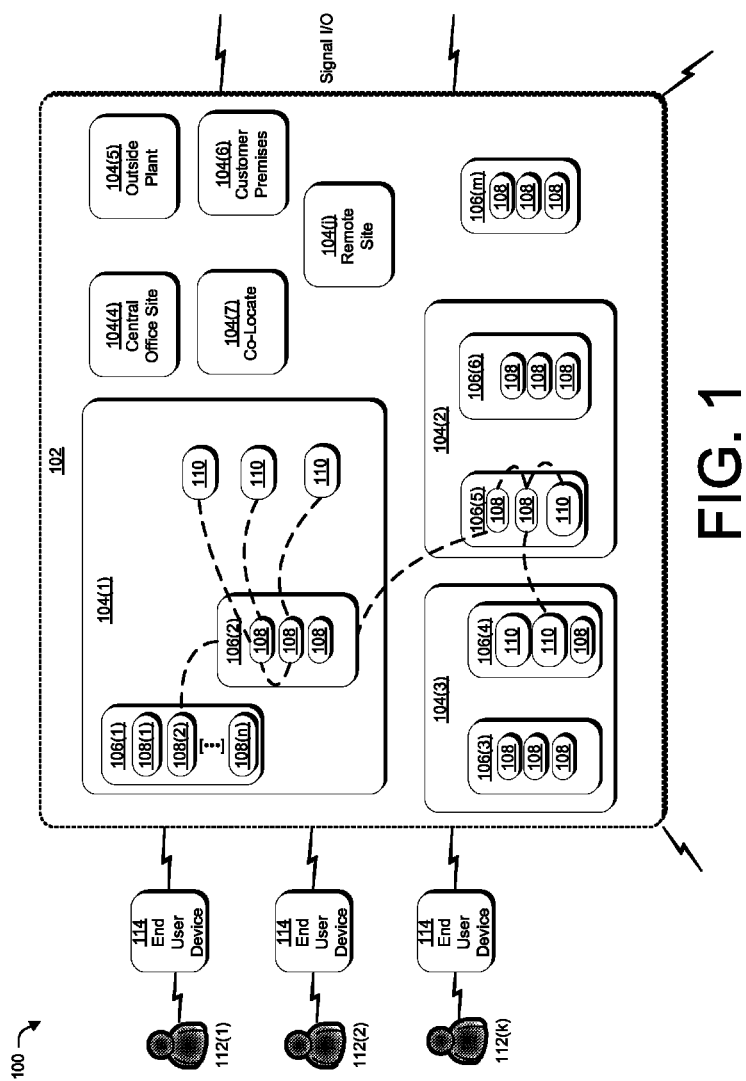
FIG. 1 illustrates an exemplary environment for a telecommunications system including a low-resistance telecommunications power distribution panel.

This disclosure is directed to power distribution systems having a lower resistance than traditional power distribution systems using copper wire thereby reducing an amount of waste heat. In some implementations, the systems include a single unitary metal busbar and a plurality of metal strips.

Traditionally, power distribution panels have been designed for manufacturability and cost and not for "efficiency" and/or for being environmentally "green." For example, the cost of manufacturing a power distribution panel may be reduced by limiting the amount of copper required to make a power distribution panel. Further, the efficiency of manufacturing a power distribution panel may be improved by utilizing Printed Circuit Boards (PCBs) instead of installing electrical wire. In addition to designing power distribution panels for manufacturability and cost, power distribution panels are further designed to meet specifications established by, for example, Underwriters Laboratories Inc. (UL) or Network Equipment-Building System (NEBS). Specifically, UL and NEBS specifications limit the maximum temperature of cables, buses and connections. Because a traditional power distribution panel is designed to meet UL and NEBS maximum temperature limits, while at the same time designed for manufacturability and cost (i.e., a reduced amount of copper and heavy use of PCBs), their operating performance is lower (i.e., they generate more waste heat) and therefore cost more to operate. Historically, this higher operations cost was insignificant relative to the cost of equipment. However, with the increased power requirements and increasing energy costs, these operation costs have become significant. Accordingly, this disclosure describes systems and methods for providing a substantially higher performing power distribution system, and therefore lower-resistance power distribution panels, for today's higher power consuming digital telecommunications network than was previously possible. To achieve these lower resistance systems, in one example this application describes low-resistance telecommunications power distribution panels having a single unitary metal busbar and a plurality of single unitary metal strips both of which are arranged from a first portion to a second portion opposite the first portion, of a low-resistance telecommunications power distribution panel. Further, along with the single unitary metal busbar and the plurality of single unitary metal strips, a single unitary metal return busbar is arranged on the second portion of the low-resistance power distribution panel.

The metal busbar and metal strips have a significantly larger cross-section than traditional copper wire used in traditional power distribution panels. The single unitary metal return busbar has a significantly larger cross-section than traditional PCB traces and/or wires, as well as significantly fewer electrical connections. Thus, the busbar, the metal strips, and return busbar provide a much larger pipe line for transmission of power thereby reducing impedance and energy loss to waste heat. The single unitary metal busbar is directly connected to a power input lug disposed proximate to the second portion. Each of the plurality of single unitary metal strips is directly connected to a power output lug also disposed proximate to the second portion. The single unitary metal busbar and the plurality of single unitary metal strips are electrically coupled, in an electric circuit, with a plurality of fuse holders arranged in the first portion of the low-resistance telecommunications power-distribution panel. In some implementations, the single unitary metal busbar is interconnected with each input connection of each of the plurality of fuse holders via a connector tab having a first end directly fastened to the single unitary metal busbar and a second end soldered to the input connection of the fuse holder. In another implementation, the single unitary metal busbar is interconnected with each input connection of each of the plurality of fuse holders via a plurality of connector tabs formed integral with the metal busbar. Here, each connector tab has a distal end that may be directly fastened to a quick disconnect mechanism connected to each input of the fuse holders. Alternatively, each of the distal ends may be soldered to each input of the fuse holders.

Because these low-resistance power distribution panels have direct connections to power inputs, power outputs, and returns, as well as single unitary metal electrical conductors arranged from the first portion to the second portion opposite the first portion of a telecommunications chassis configured to be disposed in a telecommunications rack, a more efficient electrical resistance path (i.e., fewer electrical connections) is provided. This is more cost effective with respect to operational costs over a period of time versus a lower one time unit cost.

The low-resistance power distribution panels of the present disclosure generate less waste heat, while providing higher power requirements to digital telecommunications systems. Moreover, the present disclosure describes techniques for directly connecting a fused battery power input to a single unitary metal busbar, directly connecting a plurality of single unitary metal strips to a plurality of fused power outputs, and directly connecting a return to a single unitary metal return busbar. The techniques are described in the context of a power distribution system for fiber optic telecommunications environment. However, the described techniques can be implemented in a multitude of other contexts, such as a copper-based connectivity telecommunications environment.

While the illustrated embodiments show low-resistance power distribution panels configured for use with GMT "grasshopper" type fuse panels for use in DC telecommunications power systems, other power protection devices may be used. For example, the low-resistance power distribution panel may be configured for use with TPS, TLS, breakers, KTK, KLM, TPC, or like power protection devices (i.e., fuses). Further, the low-resistance power distribution panels described herein may be configured to utilize −48VDC, +24VDC, or other voltages, suitable for powering telecommunications equipment.

Further, the terms "power input" and "power output" are used to describe "battery" or the fused electrical circuit side of the low-resistance power distribution panel. The "power input" forms one fused electrical circuit side of a fuse and the "power output" forms another fused electrical circuit side of the fuse.

Exemplary Environment

FIG. 1 illustrates an exemplary implementation of an environment 100 operable to provide a telecommunications network in which the apparatuses and procedures of the present disclosure may be employed. The environment 100 includes at least a portion of a telecommunication network infrastructure 102 (hereinafter "infrastructure") Infrastructure 102 provides telecommunications processes, structures, equipment and devices between end-user devices such as modems, phones, facsimile devices, and so on used by end-users outside of the infrastructure 102 to communicate via a telecommunications network. Within infrastructure 102 a variety of equipment, apparatus and devices are utilized in routing, processing, distributing signals, and distributing power. Telecommunications signals and data may be processed, switched, routed, tested, patched, managed, or distributed by various equipment in the infrastructure 102. Infrastructure 102 may include fiber, copper and or other types of communication cabling and transmission media utilized in routing, processing, and distributing telecommunications signals.

A variety of sites 104(1)-104(N) within infrastructure 102 may maintain various equipment used in the infrastructure 102. As depicted in FIG. 1, infrastructure 102 may have numerous sites 104 which may be different physical locations within infrastructure 102 such as a central office, a power system site, an outside plant site, a co-locate site, a remote site, or customer premises. Sites 104 may be locations within infrastructure 102 which hold a variety of structures and equipment to facilitate processing and distributing of telecommunications signals. The equipment may be centralized in one site (e.g., site 104(1)) or dispersed throughout different sites 104 in infrastructure 102. In other words, interconnections may be made between various sites 104 in infrastructure 102, as shown, for example, by the connection denoted in FIG. 1 by a dashed line between site 104(1) and 104(2). Naturally, numerous interconnections between a plurality of sites 104 may be made. The numerous interconnections between the plurality of sites may include a power distribution interconnection to each of the sites.

Each site 104 may have one or more housings 106 having a plurality of components 108. A housing 106 may be configured in a variety of ways to maintain or hold a plurality of components 108 in infrastructure 102. For example, a housing 106 may be configured as a housing for a cabinet, a terminal block, a panel, a chassis, a digital cross-connect, a switch, a hub, a rack, a frame, a bay, a module, an enclosure, an aisle, or other structure for receiving and holding a plurality of components 108. Hereinafter, the terms housing and cabinet will be used for convenience to refer to the variety of structures in infrastructure 102 that may hold components 108.

Housing 106 may be situated in a variety of locations, such as inside a building or placed outside. Housings 106, for example, may be configured to protect components 108 from environmental influences when inside or outside. FIG. 1, for instance, depicts site 104(1) as having two housings (e.g., cabinets) 106, each having a plurality of components 108. Other housings 106 may be included throughout infrastructure 102 at sites 104 as shown, for example, by housings 106 depicted within site 104(2).

Components 108 are pieces of telecommunications equipment in infrastructure 102 that may be kept or maintained in a housing 106 (e.g. cabinet) within the infrastructure 102. Components, for example, may be cross-connect panels, modules, splitters, combiners, terminal blocks, chassis, backplanes, switches, digital radios, repeaters, power distribution panels (e.g., a low-resistance power distribution panel), and so forth. Generally, components 108 may be those devices utilized for processing and distributing signals in infrastructure 102 and which may be maintained in a housing 104. Components 108 may terminate, interconnect or cross-connect a plurality of network elements 110 within infrastructure 102. For example, components 108 may be utilized to distribute telecommunications signals sent to and from infrastructure 102 by one or more end-users 112 using an end-user device 114. The interconnections between telecommunications equipment (e.g. cabinets 106, components 108 and network elements 110) provide signal pathways for telecommunications signals (e.g., optical signals, electrical signals, digital signals, and/or analog signals). Interconnection may be via one or more components 108, such as by adapters on a module, connectors on a module, or may be internal to the components 108, such as via a printed circuit board within a component 108. Representative interconnections are shown by dashed lines in FIG. 1 and numerous interconnections within and between telecommunication equipment are typical. Further, components 108 (e.g., a low-resistance power distribution panel) may be utilized to receive input power and output power to other components kept or maintained in a housing 106 (e.g. cabinet) within the infrastructure 102.

Network elements 110 may be implemented in a variety of ways. For example, network elements 110 may be configured as fiber optic equipment, switches, digital cross connect (DSX) systems, telecommunication panels, terminal blocks, digital radios, network office terminating equipment, and any other telecommunication equipment or devices employed in a telecommunications infrastructure 102. It is noted that one or more of the components 108 within a cabinet 106 may also be a network element 110. In other words, network elements 110 may be found within a cabinet 106 as a component 108 of the cabinet. Thus, in a particular cabinet 106 interconnections may be between network elements 110 externally (e.g., not in the same cabinet) or internally (e.g., within the same cabinet). Naturally, internal and external interconnections may be mixed, such that a single cabinet 106 will have both internal and external interconnections. Further, such connections for a particular cabinet 106 might be made wholly within a particular site 104 and/or between a plurality of sites 104.

The environment 100 depicts a plurality of end users 112 (1)-112(M) which may be communicatively coupled, one to another, via a telecommunication network including infrastructure 102. End users 112 may refer to a variety of users, such as consumers, business users, internal users in a private network, and other types of users that use telecommunications signals or transmit and receive telecommunications signals via client devices. Additionally, for purposes of the following discussion clients 112(1)-112(M) may also refer to the client devices and software which are operable to transmit and receive telecommunications signals. Thus, clients 112(1)-112(M) may be implemented as users, software and/or devices.

The interconnection of pieces of equipment (e.g. cabinets 106, components 108 and network elements 110, and so forth) provides signal pathways between equipment for signals input to and output from infrastructure 102. For example, end-users 112(1)-112(M) may send signals into the infrastructure 102 and receive signals output from the infrastructure using a variety of end user devices 114. End user 112(1), for instance, may communicate with end user 112(M) via end-user device 114 (e.g., a telephone). Thus, signals sent to and from infrastructure by end-users 112 via an end user device 114 may be routed directed, processed, and distributed in a variety of ways via the equipment and interconnections within infrastructure 102.

Example Power System

Figure 2:
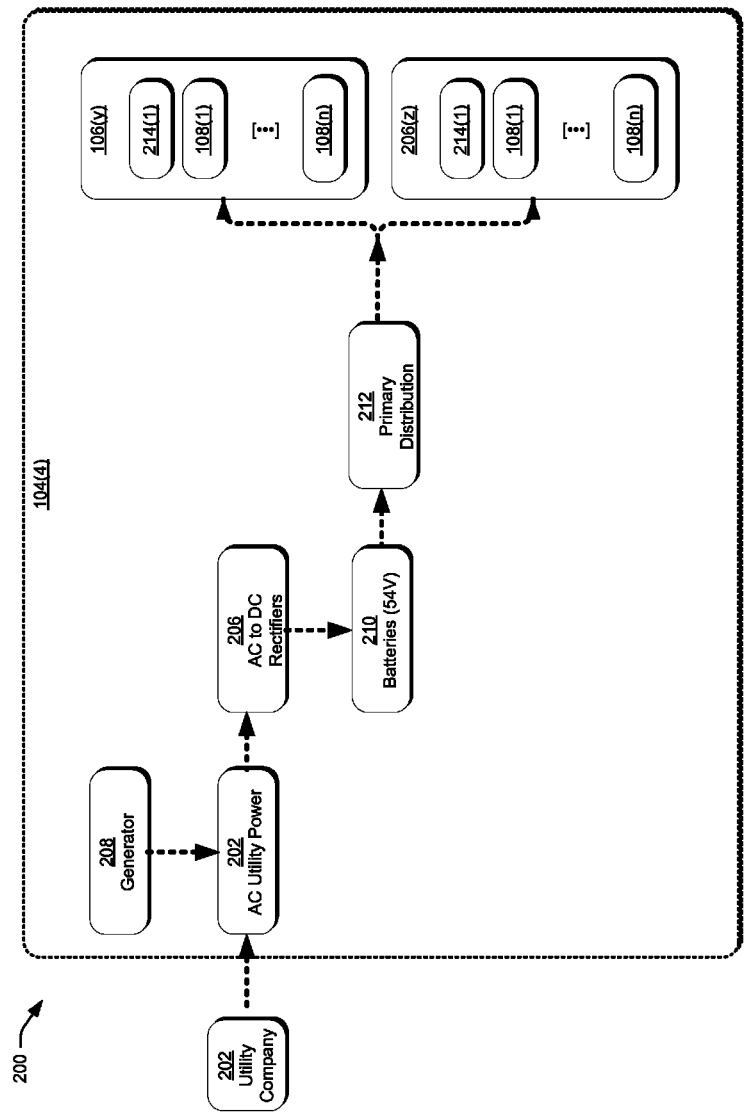
FIG. 2 illustrates an exemplary implementation of a central office direct current (DC) power system for use in telecommunications systems including a low-resistance telecommunications power distribution panel.

FIG. 2 illustrates an exemplary implementation of a central office direct current (DC) power system 200 for use in telecommunications systems. The central office DC power system 200 may deliver power in the environment 100. Typically, alternating current (AC) utility power 202 may be delivered to a central office site 104(4) via a utility company 204. The utility power 202 may be stepped down from high voltage transmission levels to levels useable by a rectifier 206. Rectifier 206 may be configured to convert 240 volts AC (VAC) or 480 VAC to −48VDC or +24VDC. In the absence of utility power 202 a switch enables a generator 208 to provide backup AC power. The time for a generator 208 to synchronize and provide usable power may be in the minutes range. In an event where utility power 202 is not available, batteries 210 supply DC power and are sized to allow the generators 208 to come on line. A primary distribution system 212 may be arranged in the power system 200 and is typically a Battery Distribution Frame Bay (BDFB). The BDFB may have input capacities of 800 amps and outputs circuits up to 125 amps. Secondary distribution systems 214(1) may be located in cabinets 106 (Y) and 106(Z), each of which, bring 100 amps and deliver up to 20 amp circuits. The secondary distribution systems 214(1) distribute power to each component 108(1)-108(N) and may be a low-resistance telecommunications power distribution panel. Here, with respect to the power system 200, each component 108(1)-108(N) may be considered a load. As discussed above, site 104(4) may comprise cabinets 106, each having a plurality of components 108, which are pieces of telecommunications equipment in infrastructure 102 that may be kept or maintained in a housing 106 (e.g. cabinet) within the infrastructure 102.

Example Telecommunications Cabinet

Figures 3A, 3B:
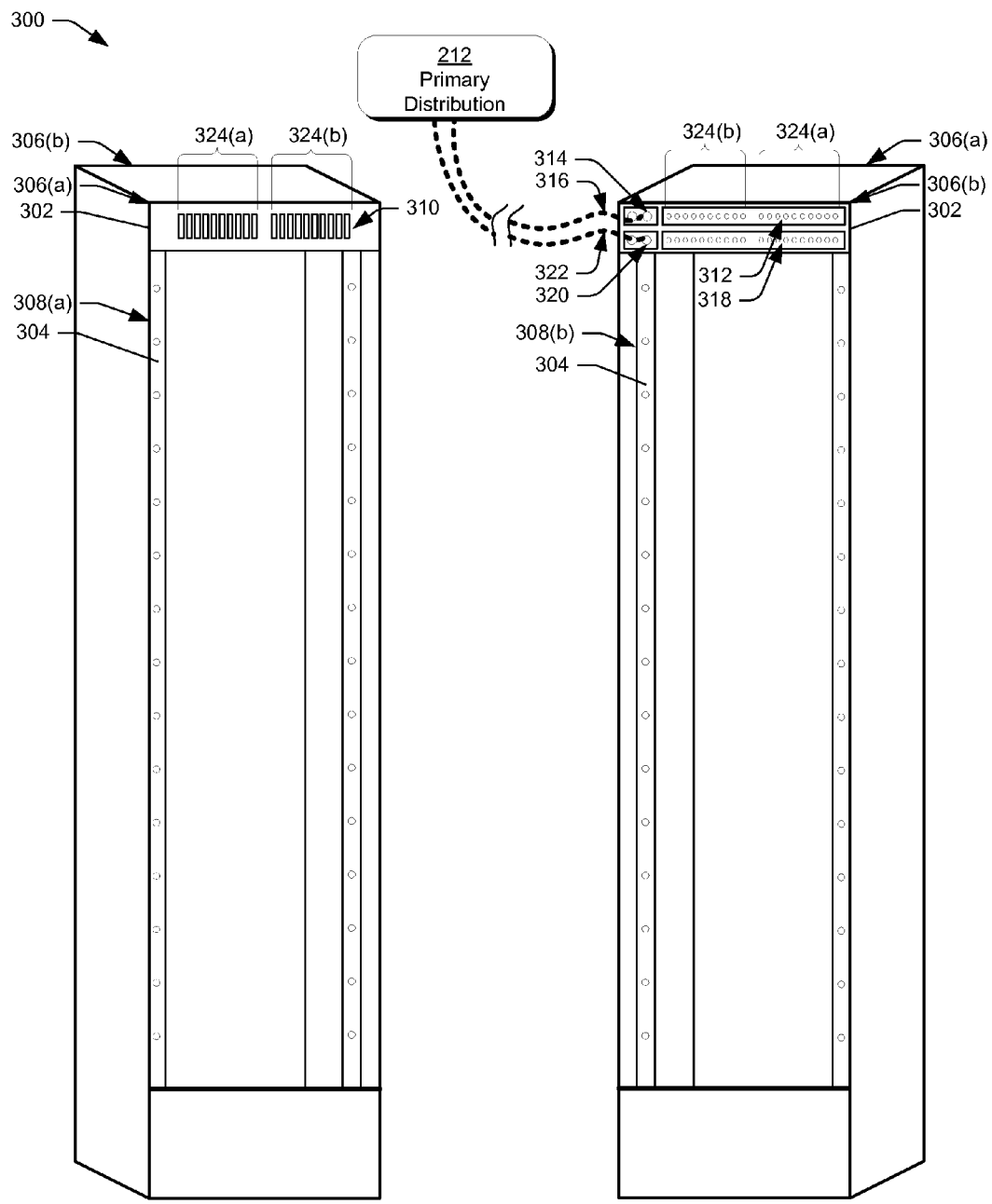
FIG. 3A and FIG. 3B illustrate front and rear views, respectively, of an exemplary telecommunications rack populated with a low-resistance telecommunications power distribution panel.

FIG. 3A and FIG. 3B show one exemplary implementation of a telecommunications cabinet 300 for use in infrastructure 102. Cabinet 300 serves as a central location for connecting multiple telecommunication equipment. Cabinet 300 is shown populated with a low-resistance telecommunications power distribution panel 302 which may be coupled to a telecommunications rack 304.

FIGS. 3A and 3B show a first portion 306(A) (e.g., a front) and a second portion 306(B) (e.g., a back) opposite the first portion 306(A) of the low-resistance telecommunications power distribution panel 302. Here, FIG. 3(A) illustrates the first portion 306(A) may be disposed proximate to a first cabinet portion 308(A). FIG. 3(A) further illustrates the low-resistance telecommunications power distribution panel 302 having a plurality of fuse holders 310 arranged in the first portion 306(A) of the low-resistance telecommunications power distribution panel 302. Each fuse holder 310 has a power input connection and a power output connection disposed behind the first portion 306(A). Fuse holders 310 may be configured to hold GMT fuses, TPC fuses, TPS fuses, breakers, or the like, suitable for telecommunications applications. Further, the low-resistance telecommunications power distribution panel 302 may comprise any number of fuse holders 310. Here, for example, FIG. 3A and FIG. 3B illustrate the low-resistance telecommunications power distribution panel 302 comprising 10 fuse holders 310. However, the low-resistance telecommunications power distribution panel 302 may comprise 5, 15, 20, or any quantity of fuse holders 310. In some embodiments, the quantity of fuse holders 310 a low-resistance telecommunications power distribution panel 302 may be based at least in part on how many components 108 a cabinet 106 is configured to house.

FIG. 3(B) shows the second portion 306(B) opposite the first portion 306(A) of the low-resistance telecommunications power distribution panel 302 may be disposed proximate to a second cabinet portion 308(B). The second portion 306(B) may comprise a plurality of fused battery outputs 312 arranged in the second portion 306(B) of the low-resistance telecommunications power distribution panel 302. Each fused battery output 312 may be electrically interconnected with a respective fuse holder 310 and may be configured to directly connect to a power output lug disposed proximate to the second portion 306(B) of the low-resistance telecommunications power distribution panel 302. The power output lugs may be connected to electrical wire that provides power to telecommunications components 108 housed within the cabinet 106. FIG. 3(B) further shows battery input 314 disposed proximate to the second portion 306(B) of the low-resistance telecommunications power distribution panel 302. Battery input 314 may be configured to directly connect with a power input cable 316. Here, the power input cable 316 may be connected with the primary distribution system 212 of FIG. 2. FIG. 3(B) also illustrates a plurality of return outputs 318 and a return input 320 arranged in the second portion 306(B) of the low-resistance telecommunications power distribution panel 302. Each return output 318 may be configured to directly connect to a return output lead disposed proximate to the second portion 306(B) of the low-resistance telecommunications power distribution panel 302. Each of the plurality of return output leads may comprise a lug connected to electrical wire that provides a return for telecommunications components 108 housed within the cabinet 106. Return outputs 318 may be directly connected with return input 320, via a single unitary metal return busbar. Return input 320 may be directly connected to a return input cable 322 disposed proximate to the second portion, and may be referenced to the earth ground plane (i.e., the non-fused side).

FIG. 3(A) and FIG. 3(B) illustrate the low-resistance telecommunications power distribution panel 302 comprising a redundant side 324(A) and redundant side 324(B). Redundant sides 324(A) and 324(B) are symmetrical mirror images of each other and may be configured to provide redundancy power distribution in cabinet 300.

Example Low-Resistance Telecommunications Power Distribution Panel

Figure 4A:
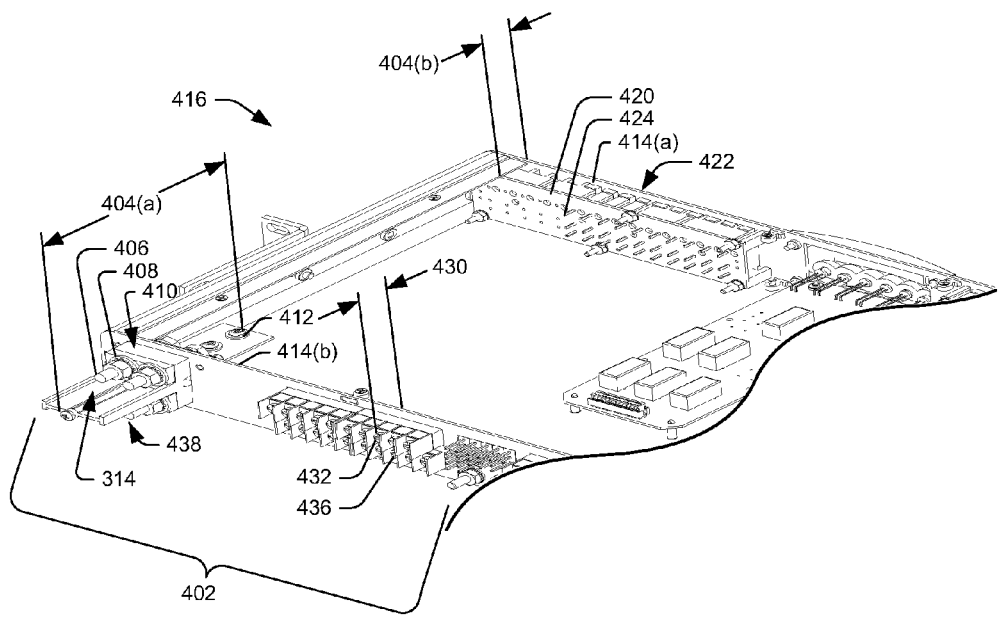
FIG. 4A shows an illustrative isometric view of redundant side (B) of an existing telecommunications power distribution panel.
Figure 4B:
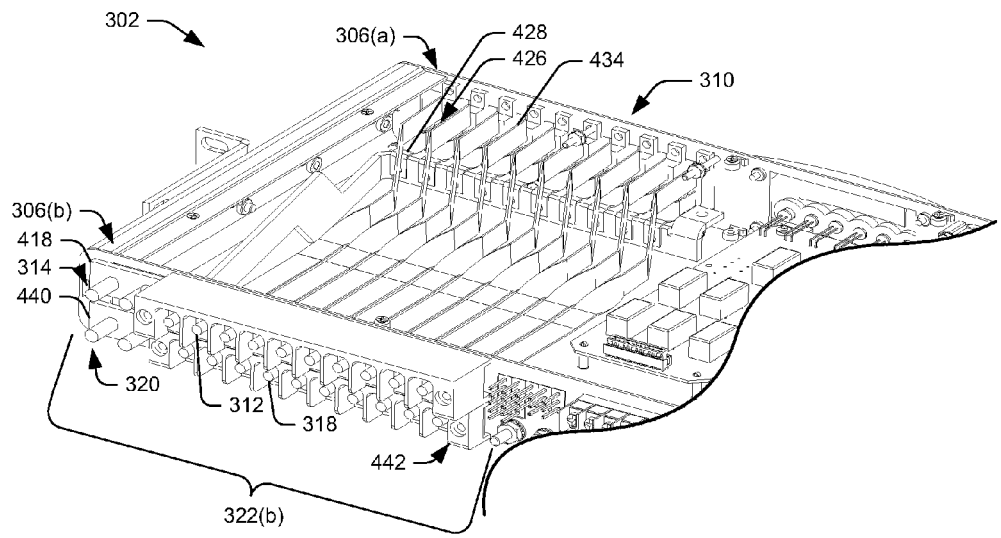
FIG. 4B shows alongside an illustrative redundant side (B) of a low-resistance telecommunications power distribution panel.

FIG. 4A shows an illustrative isometric view of a redundant side 402 of an existing telecommunications power distribution panel, and FIG. 4B shows an illustrative isometric view of the redundant side 324(A) of the low-resistance telecommunications power distribution panel 302 of FIG. 3.

Example Power Input

FIG. 4A shows, the conventional redundant side 402 as comprising an assembly of interconnects 404(A) and 404(B). The assembly of interconnects 404(A) forms the battery input 314 and provides for connecting the power input cable 316 of FIG. 3. Here, the assembly of interconnects 404(A) may be interconnected via electrical wire to the assembly of interconnects 404(B). FIG. 4A illustrates the assembly of interconnects 404(A) may comprise multiple connections configured to conduct electricity. Each connection of each component of the assembly of interconnects 404(A) produces resistance, and therefore, produces waste heat. For example, the assembly of interconnects 404(A) would require the input cable 316 to conduct electricity through a resistance path comprising a bolt 406 connected to a washer 408, the washer 408 connected to a bracket 410 (the bracket 410 itself may have multiple connections configured to conduct electricity), and the bracket 410 connected to a compression lug 412. Further, the assembly of interconnects 404(A) is illustrated as sandwiching a second chassis portion 414(B) opposite a first chassis portion 414(A) of a telecommunications power distribution panel 416. Here, the sandwiching of the second chassis portion 414(B) produces multiple interfaces, and therefore multiple connections, and therefore more waste heat.

In contrast, the low-resistance telecommunications power distribution panel's 302 redundant side 324(A) is illustrated, in FIG. 4B, as comprising a single unitary metal busbar 418. Here, the single unitary metal busbar 418 may provide direct connection to the power input cable 316 of FIG. 3, and may form the battery input 314. For example, the single unitary metal busbar 418 would require the input cable 316 to conduct electricity through a resistance path comprising the single unitary metal busbar 418. Further, the single unitary busbar 418 penetrates and passes directly through the second portion 306(B) of the low-resistance telecommunications power distribution panel 302, which eliminates the sandwiching interfaces of the assembly of interconnects 404(A), eliminating multiple connections and therefore eliminating waste heat.

Proceeding with the conventional redundant side 402 of FIG. 4A, the conventional redundant side 402 illustrates the assembly of interconnects 404(B) having multiple connections configured to conduct electricity. The assembly of interconnects 404(B) may be interconnected with the assembly of interconnects 404(A) via an electrical wire (e.g., a cable). The assembly of interconnects 404(A) is illustrated as comprising primarily of a printed circuit board (PCB) 420. The assembly of interconnects 404(B) provides for interconnecting the electrical wire and a plurality of fuse holders 422 arranged on the first chassis portion 414(A) of the telecommunications power distribution panel 416. Here, FIG. 4A illustrates the assembly of interconnects 404(B) requires electricity to conduct through a resistance path comprising the electrical wire connected to a pin 424, the pin 424 connected to traces formed within the PCB 420, the PCB 420 traces connected to the plurality of fuse holders 422.

In contrast, the low-resistance telecommunications power distribution panel's 302 redundant side 324(A) illustrates the single unitary metal busbar 418, may be configured to be directly connected to the power input cable 316, and may be arranged from the first portion 306(A) to the second portion 306(B). The single unitary metal busbar 418 may be directly interconnected with each of the input connections 426 of the plurality of fuse holders 310 via a connector tab 428. For example, the single unitary metal busbar 418 may require the connector tab 428 to conduct electricity through a resistance path comprising the connector tab 428 connected to the input connection 426 of a fuse holder 310. Because the single unitary metal busbar 418 may be directly interconnected with each of the input connections 426 of the plurality of fuse holders 310, via a connector tab 428, the assembly of interconnects 404(B) is eliminated. With the elimination of the assembly of interconnects 404(B), the multiple connections are eliminated, which eliminates waste heat.

Example Power Output

The conventional redundant side 402 shows that power output from the plurality of fuse holders 422 is electrically conducted back through PCB 420 in substantially the same way as the assembly of interconnects 404(B). Again, here the assembly of interconnects 404(B) conducts electricity, via a plurality of electrical wires, from the plurality of fuse holders 420 to another assembly of interconnects 430. The other assembly of interconnects 430 comprises multiple connections similar to the assembly of interconnects 404(B). For example the other assembly of interconnections 430 may require electricity to conduct through a resistance path comprising a wire connected to a pin, the pin connected to traces formed within the PCB, the PCB traces connected to a plurality of battery output connectors 432. Further, the assembly of interconnects 430 is illustrated as sandwiching the second chassis portion 414(B), which produces multiple interfaces, and therefore, multiple connections, and therefore more waste heat.

In contrast, the low-resistance telecommunications power distribution panel's 302 redundant side 324(A) illustrates a plurality of single unitary metal strips 434 may be arranged from the first portion 306(A) to the second portion 306(B) of the low-resistance power distribution panel 302. Here, each single unitary metal strip 434 may provide direct connection to a power output lead disposed proximate to the second portion 306(B). Each of the single unitary metal strips 434 may form each of the fused battery outputs 312. For example, a single unitary metal strip 434 would require a power lead to conduct electricity through a resistance path comprising the single unitary metal strip 434. Further, the single unitary metal strip 434 penetrates and passes directly through both the first portion 306(A) and the second portion 306(B) of the low-resistance telecommunications power distribution panel 302. Because the single unitary metal strip 434 penetrates and passes directly through both the first portion 306(A) and the second portion 306(B), this eliminates both the sandwiching interfaces of the assembly of interconnects 404(B), and the assembly of interconnects 430, eliminating multiple connections and therefore eliminating waste heat.

Example Return

The conventional redundant side 402 of FIG. 4A illustrates a plurality return outputs 436 arranged in the second chassis portion 414(B). Each return output 436 may be electrically interconnected with a traditional return input 438 through an assembly of interconnects (e.g., a wire connected to a pin, a pin connected to a trace formed within a PCB, a PCB trace connected to a return output, or a PCB trace connected to a return input).

In contrast, the low-resistance telecommunications power distribution panel's 302 redundant side 324(A) illustrates a single unitary metal return busbar 440. Here, the single unitary return busbar 440 may provide direct connection to the earth ground plane, and may form both the plurality of return outputs 318, and the return input 320. The single unitary metal return busbar 440 may be substantially planar and may comprise an isolation member 442 coupled with the single metal return busbar 440. Here, the isolation member 442 is illustrated as comprising a plurality of apertures arranged in a single unitary unit formed of a dielectric (e.g., plastic) material. The isolation member 442 may be configured to provide for connecting the return output lugs for telecommunications components 108 housed within the cabinet 106.

Embodiments of Low-Resistance Telecommunications Power Distribution Panel

Figure 5:
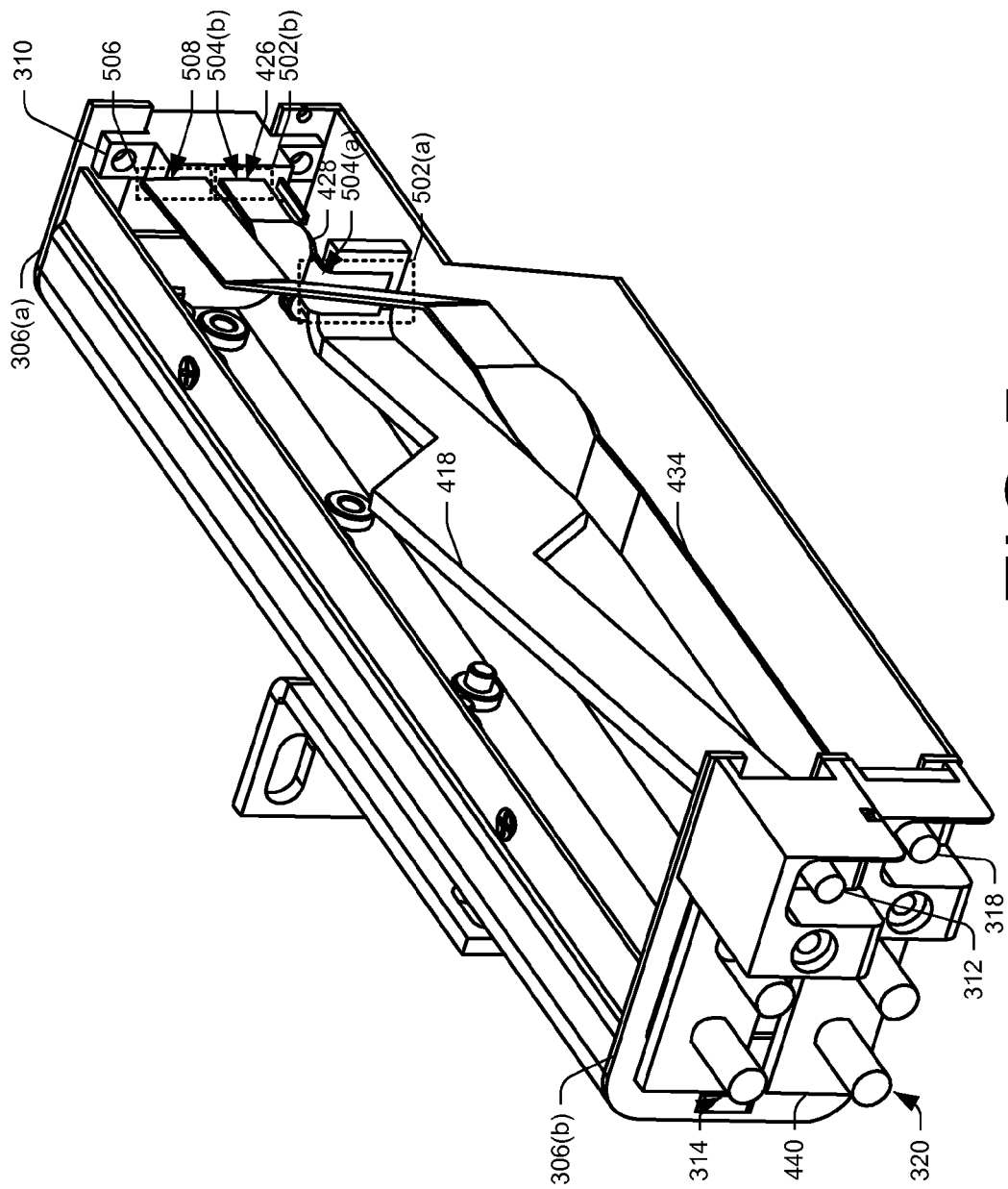
FIG. 5 shows an isometric cross-sectional view of the redundant side (B) of the low-resistance telecommunications power distribution panel of FIG. 4B, illustrating a fuse holder connected with a single unitary metal busbar and a single unitary metal strip.

FIG. 5 shows an isometric cross-sectional view of the redundant side (B) of the low-resistance telecommunications power distribution panel of FIG. 4B, illustrating the fuse holder 310 connected with the single unitary metal busbar 418 and a single unitary metal strip 434. A location 502(A) illustrates a first end 504(A) of the connector tab 428 may be connected with the single unitary metal busbar 418. A location 502(B) illustrates a second end 504(B) of the connector tab 428 may be connected with the input 426 of the fuse holder 310. The connection of the first end 504(A) of the connector tab 428 illustrated in location 502(A) may be any type of electrical connection. For example, the first end 504(A) of the connector tab 428 and the single unitary metal busbar 418 illustrated in location 502(A) may be configured with an aperture configured to receive a fastener (e.g., a threaded bolt, a clamp, a pin, a rivet, or the like). Further, the connection of the first end 504(A) of the connector tab 428 illustrated in location 502(A) may be formed integral with the single unitary metal busbar 418 (e.g., each connector tab may be an extension of material forming the single unitary metal busbar 418)

With respect to location 502(B), the connection of the second end 504(B) of the connector tab 428 illustrated in location 502(B) may be any type of electrical connection. For example, the second end 504(B) of the connector tab 428 and the input 426 of the fuse holder 310 illustrated in location 502(B) may be a solder connection or an adhesive connection. Further, the connection of the second end 504(B) of the connector tab 428 illustrated in location 502(B) may be fasten to a quick disconnect mechanism forming the input 426 of the fuse holder 310 (e.g., the second end 504(B) of each connector tab may be configured to be received by a female interference fit sleeve, a gripping portion, a clamping portion, or the like).

A location 506, illustrated in FIG. 5, shows a single unitary metal strip 434, of the plurality of single unitary metal strips 434 of FIG. 4B, may be directly connected to an output 508 of the fuse holder 310. Here, the connection of the single unitary metal strip 434 illustrated in location 506 may be any type of electrical connection. For example, the single unitary metal strip 434 and the output 508 of the fuse holder 310 illustrated in location 506 may be a solder connection or an adhesive connection. Further, the connection of the single unitary metal strip 434 illustrated in location 508 may be fasten to a quick disconnect mechanism forming the output 508 of the fuse holder 310 (e.g., each of the single unitary metal strips 434 may be configured to be received by a female interference fit sleeve, a gripping portion, a clamping portion, or the like).

Example Single Unitary Metal Busbar

Figure 6:
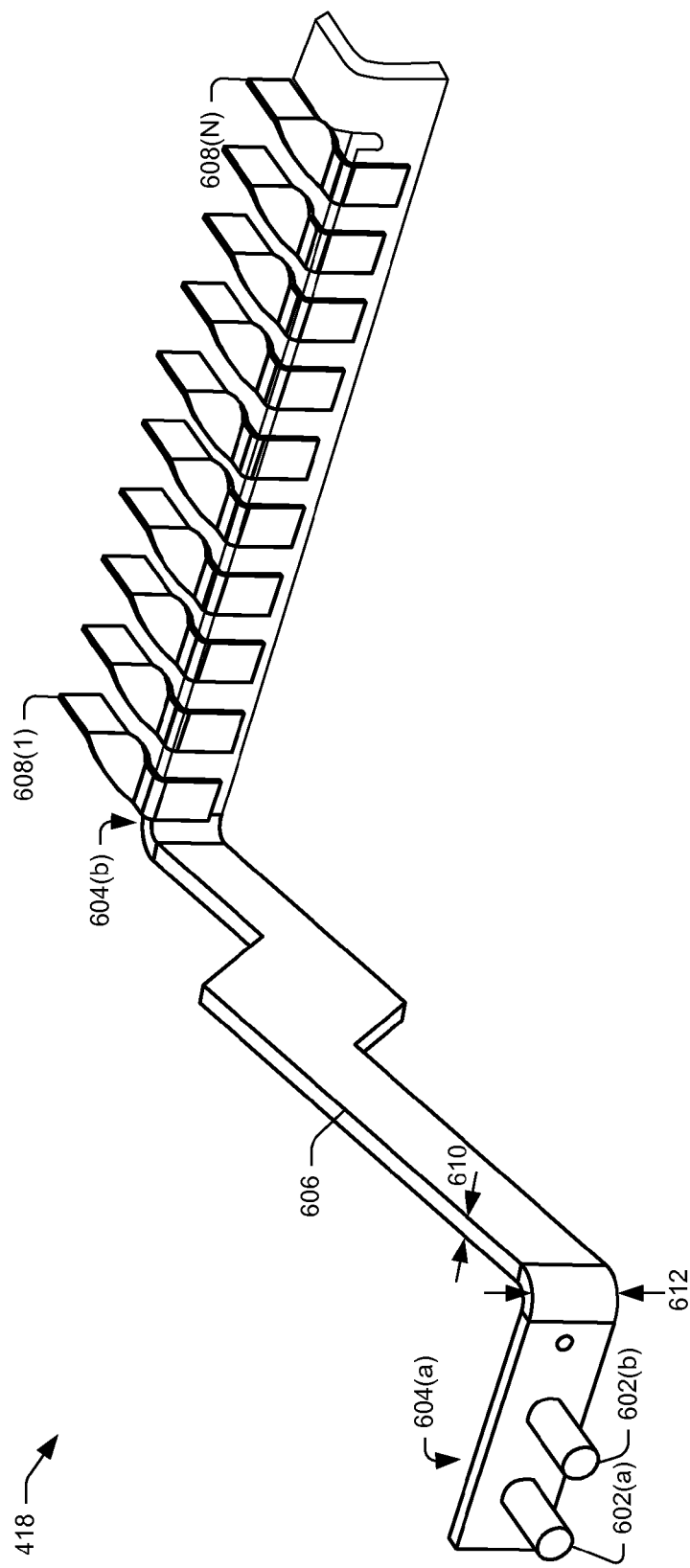
FIG. 6 shows an illustrative single unitary metal busbar.

FIG. 6 depicts, a single unitary metal busbar 418 configured to be arranged from the first portion 306(A) to the second portion 306(B) opposite the first portion 306(A), of the low-resistance power distribution panel 302 of FIG. 3. As FIG. 6 depicts, the single unitary metal busbar 418 may be a single unit of material, which may comprise two ninety degree bends. The single unitary metal busbar 418 may comprise a battery input 602(A) and 602(B) directly connected with a first end 604(A) opposite a second end 604(B) of a bar 606, and may comprise a plurality of connector tabs 608(1)-(N) arranged on the second end 604(B). While FIG. 6 illustrates 10 connector tabs 608 arranged on the second end 604(B) of the bar 606, any number of connector tabs 608(1)-(N) may be arranged on the second end 604(B) of the bar 606. For example, the single unitary metal busbar 418 may be configured to comprise a predetermined quantity of connector tabs 608(1)-(N) based on a number of telecommunications equipment 108(1)-(N) that may be installed in a telecommunications cabinet 106, which the low-resistance telecommunications power distribution panel 302 may be configured to distribute power to. The single unitary metal busbar 418 may be formed of copper, aluminum, steel, gold, or the like. Further, the single unitary metal busbar 418 may be plated.

FIG. 6 illustrates the single unitary metal busbar 418 having a width 610 and a height 612 that may form a rectangular cross-sectional area (i.e., a circular mil) that may be configured to provide an optimized electrical conduction path. The rectangular cross-sectional area may be based on a price of copper and a workload of the low-resistance telecommunications power distribution panel 302. While FIG. 6 illustrates a rectangular cross-sectional area, other cross-sectional area shapes are contemplated. For example, the cross-sectional area may be circular, triangular, polygonal, or any other shape suitable for forming a single unitary metal busbar. Further, with the single unitary metal busbar 418 comprising a width 610 and a height 612 that may form a cross-sectional area that may be configured to provide an optimized electrical conduction path, the cross-sectional area may be configured to be a larger cross-sectional area than a cross-sectional area of a wire or combination of wires that may be installed in the low-resistance telecommunications power distribution panel 302.

Example Single Unitary Metal Strips

Figure 7:
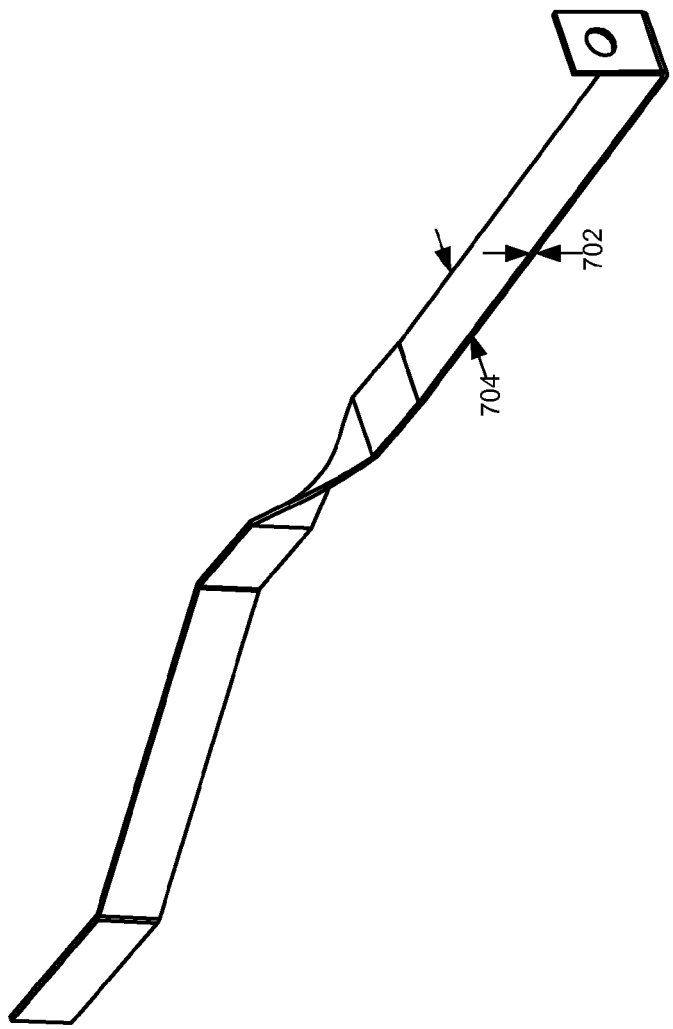
FIG. 7 shows an illustrative single unitary metal strip.

FIG. 7 illustrates a single unitary metal strip 434 of the plurality of single unitary metal strips 434 that may be configured to be arranged from the first portion 306(A) to the second portion 306(B) of the low-resistance power distribution panel 302.

Here, FIG. 7 illustrates the single unitary metal strip 434 comprising a width 702 and a height 704 that may form a rectangular cross-sectional area (i.e., a circular mil) that may be configured to provide an optimized electrical conduction path. Each rectangular cross-sectional area of each single metal unitary metal strip 434 may be based on a price of copper and a workload of the low-resistance telecommunications power distribution panel 302. While FIG. 7 illustrates a rectangular cross-sectional area, other cross-sectional area shapes are contemplated. For example, the cross-sectional area may be circular, triangular, polygonal, or any other shape suitable for forming a single unitary metal strip. Further, with the single unitary metal strip 434 comprising a width 702 and a height 704 that form a cross-sectional area that may be configured to provide an optimized electrical conduction path, the cross-sectional area may be configured to be a larger cross-sectional area than a cross-sectional area of a wire or combination of wires that may be installed in the low-resistance telecommunications power distribution panel 302.

Example Process for Using a Low-Resistance Telecommunications Power Distribution Panel FIG. 8 is a flow diagram that illustrates an exemplary process 800 for installing and using a low-resistance telecommunications power distribution panel. In some instances, this process begins at operation 802 with the connecting of a single unitary metal busbar (e.g., single unitary metal busbar 418) to a power input lug. Here, the single unitary metal busbar may be arranged from a first portion (e.g., first portion 306(A)) to a second portion (e.g., second portion 306(B)) opposite the first portion of a low-resistance telecommunications power distribution panel (e.g., low-resistance telecommunications power distribution panel 302), and the power input lug may be connected to a power input cable (e.g., power input cable 316) disposed proximate to the second portion of the low-resistance telecommunications power distribution panel. Further, the connection of the single unitary metal busbar and the power input lug, at operation 802, may define a resistance path consisting of the power input lug directly connected to the single unitary metal busbar.

Process 800 includes, operation 804, which represents connecting a single unitary metal strip (e.g., single unitary metal strip 418) to a power output lug. Here, the single unitary metal strip may be arranged from the first portion to the second portion opposite the first portion of the low-resistance telecommunications power distribution panel, and the power output lug may be connected to a power output wire disposed proximate to the second portion of the low-resistance telecommunications power distribution panel. The power output electrical wire may provide power to telecommunications components (e.g., telecommunications components 108) housed within a cabinet (e.g., cabinet 106). Further, the connection of the single unitary metal strip and the power output lug, at operation 804, may define a resistance path consisting of the power output lug directly connected to the single unitary metal strip. While operation 804 describes connecting a single unitary metal strip to a power output lug, operation 804 may include connecting a plurality of single unitary metal strips to a plurality of power output lugs.

Operation 804 may be followed by operation 806, which represents connecting a single unitary metal return busbar (e.g., single unitary metal busbar 440) to a return output lug and a return input lug. The connection of the single unitary metal return busbar to the return output lug and the return input lug defining a resistance path consisting of the return output lug and the return input lug directly connected to the single unitary return busbar. While operation 806 describes connecting a single unitary metal return busbar to a return output lug, operation 806 may include connecting a plurality of return output lugs to the single unitary metal return busbar.

Process 800 may be completed, at operation 808, which represents electrically coupling a fuse (e.g., GMT fuses, TPC fuses, TPS fuses, breakers, or the like) with the single unitary metal busbar and the single unitary metal strip. Here, the fuse may be electrically coupled with the single unitary metal busbar and the single unitary metal strip via a fuse holder (e.g., fuse holder 310) arranged in the first portion of the low-resistance telecommunications power distribution panel. The fuse holder having an input connection (e.g., input connection 426) and an output connection (e.g., output connection 508), and wherein the single unitary busbar may be interconnected with the input connection and the single unitary metal strip may be directly connected to the output connection. While operation 808 describes electrically coupling a single fuse with the single unitary metal busbar and the single unitary metal strip, operation 808 may include electrically coupling a plurality of fuses with a single unitary busbar and a plurality of single unitary metal strips.

Figure 9:
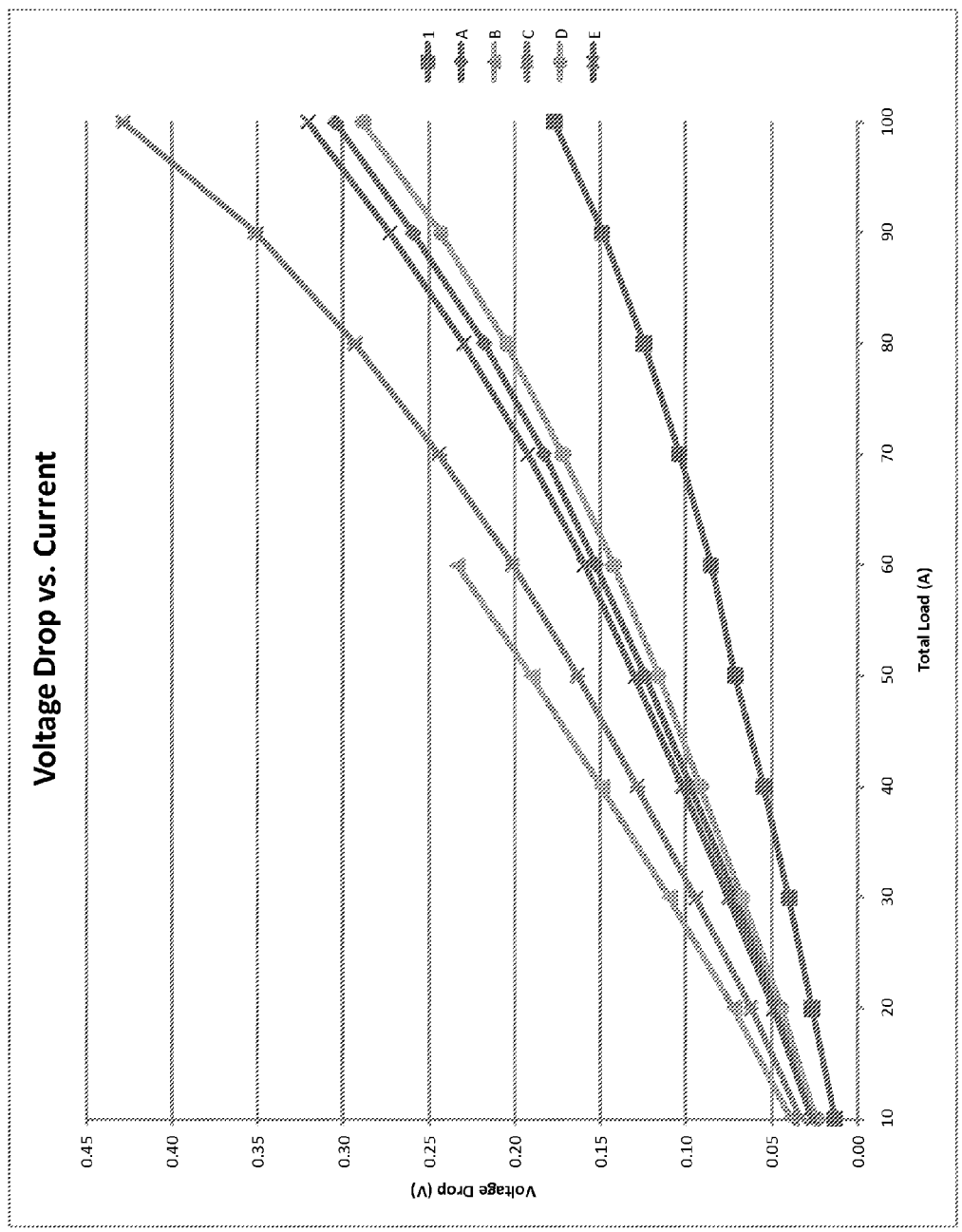
FIG. 9 illustrates a low-resistance power distribution panel performance curve versus five other traditional power distribution panel performance curves.

FIG. 9 illustrates a low-resistance power distribution panel performance curve versus five other traditional power distribution panel performance curves. The performance curves illustrate voltage drop (V) on the y-axis versus total load (A) on the x-axis. Performance curve 1 represents a performance of a low-resistance power distribution panel (e.g., low-resistance power distribution panel 302). Performance curves A-E represent performances of traditional power distribution panels. For example, performance curves A-E may represent five other power distribution panels produced by telecommunications vendors, three of which may be produced by other telecommunications vendors, other than the telecommunications vendor that produces the low-resistance power distribution panel. For example, curve B may represent a Trimm, Inc. GMT fuse panel having part number 7570198202, curve C may represent a Noran Tel Inc., a subsidiary of Westell, Inc.™, GMT fuse panel having part number N250120-N/L9, and curve D may represent an ADC SuperPower™ GMT fuse panel having part number PWX-031RXCSD10PWDP. Trimm Inc. is located in Butner, N.C., Noran Tel, Inc. is located in Regina, Saskatchewan, and ADC is located in Eden Prairie, Minn. Curve A and curve E may represent Telect GMT fuse panels having part numbers HPGT10 and 20HPGMT05R, respectively. Telect is located in Liberty Lake, Wash.

FIG. 9 illustrates the low-resistance power distribution panel performance curve (i.e., performance curve 1) as being significantly more efficient than the traditional power distribution panel performance curves (i.e., performance curves A-E). For example, the low-resistance power distribution panel curve illustrates a significantly lower voltage drop across the low-resistance power distribution panel. As discussed above, this is because the low-resistance power distribution panel comprises fewer electrical connections than the traditional power distribution panels A-E, as well as because the low-resistance power distribution panel comprises cross-sectional areas configured to provide an optimized electrical conduction path (e.g., cross-sectional areas of the single unitary metal busbar 418, the single unitary metal strips 434, and the single unitary metal return busbar 440). The reduction in resistance is illustrated in FIG. 9 in two ways. First, the slope of the voltage drop of the low-resistance power distribution panel is substantially less than the traditional power distribution panels. Here, the slope is directly attributed to the larger current capacity of the single unitary metal busbar 418 and the plurality of single unitary metal strips 434 connected to the fuses and reduced number of electrical connections. Secondly, the substantial decrease in nonlinearity of the low-resistance power distribution panel in comparison to the traditional power distribution panels is attributed to the lack of heat created by the buss. Increases in buss temperature cause resistances of copper to increase which is highly undesirable.

In contrast, traditional power distribution panels have copper wire or busbars sized appropriately for the maximum fuse current. For example, if a 20 amp GMT fuse can be inserted into a panel, the proper size of the buss cabling can be looked up in a table. In the case of cables, a designer can pick a wire size with a certain temperature limit and look up the required wire gauge. In the case of a busbar, the designer can choose a maximum temperature and look up the circular mills requirement.

Again, as illustrated in FIG. 9, because the traditional power distribution panels have a significantly greater amount of electrical connections, a minimum wire gauge, and/or a minimum cross-sectional area (i.e., circular mil), the traditional power distribution panels are significantly less efficient.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A low-resistance telecommunications system comprising:
   a telecommunications rack;
   a low-resistance telecommunications power distribution panel coupled to the rack to distribute power to a plurality of telecommunications equipment coupled to the rack, the low-resistance power distribution panel comprising:
   a single unitary metal busbar arranged from a first portion to a second portion opposite the first portion, of the low-resistance power distribution panel, the single unitary metal busbar configured to directly connect to a power cable disposed proximate to the second portion;
   a single unitary metal strip arranged from the first portion to the second portion of the low-resistance power distribution panel, the single unitary metal strip configured to directly connect to a power lead disposed proximate to the second portion; and
   a single unitary metal return busbar arranged on the second portion of the low-resistance power distribution panel, the single unitary metal return busbar configured to directly connect a return cable to a return output lead disposed proximate to the second portion.

2. The low-resistance telecommunications system of claim 1, further comprising a fuse holder arranged in the first portion of the low-resistance power distribution panel, the fuse holder having an input connection and an output connection, wherein the single unitary metal busbar is further configured to directly interconnect with the input connection of the fuse holder.

3. The low-resistance telecommunications system of claim 2, wherein the single unitary metal busbar is directly interconnected with the input connection of the fuse holder via a connector tab, wherein a first end of the connector tab is directly fastened to the single unitary metal busbar and a second end of the connector tab is soldered to the input connection.

4. The low-resistance telecommunications system of claim 2, wherein the single unitary metal busbar is directly interconnected with the input connection of the fuse holder via a connector tab formed integral with the single unitary metal busbar, wherein a distal end of the connector tab is soldered to the input connection.

5. The low-resistance telecommunications system of claim 2, wherein the single unitary metal busbar is directly interconnected with the input connection of the fuse holder via a connector tab formed integral with the single unitary metal busbar, wherein a distal end of the connector tab is fastened to a quick disconnect mechanism connected to the input connection.

6. The low-resistance telecommunications system of claim 2, wherein the single unitary metal strip is directly connected to the output connection of the fuse holder.

7. The low-resistance telecommunications system of claim 6, wherein the single unitary metal strip is directly connected to the output connection via a solder connection.

8. The low-resistance telecommunications system of claim 2, wherein the single unitary metal strip is interconnected with the output connection of the fuse holder via a quick disconnect mechanism connected to the output connection.

9. The low-resistance telecommunications system of claim 1, wherein the direct connection of the single unitary metal busbar and the power cable defines a resistance path consisting of the power cable directly connected to the single unitary metal busbar.

10. The low-resistance telecommunications system of claim 1, wherein the direct connection of the single unitary metal strip and the power lead defines a resistance path consisting of the power lead directly connected to the single unitary metal strip.

11. The low-resistance telecommunications system of claim 1, wherein the telecommunications rack comprises a 23 inch rack or 19 inch rack.

12. The low-resistance telecommunications system of claim 2, wherein the fuse holder includes an interface configured to electrically couple with a GMT fuse.

13. A low-resistance telecommunications power distribution panel comprising:
a chassis having a first portion and a second portion opposite the first portion;
a plurality of fuse holders arranged along the first portion, each fuse holder having an input connection and an output connection;
a power input lug disposed proximate to the second portion;
a metal busbar arranged from the first portion to the second portion configured to directly connect the power input lug to the input connection of each fuse holder;
a plurality of metal strips arranged from the first portion to the second portion, each metal strip directly interconnecting each output connection to a respective power output lug disposed proximate to the second portion; and
a metal return busbar arranged on the second portion configured to directly connect a plurality of return output lugs to a return input lug disposed proximate to the second portion.

14. The low-resistance telecommunications power distribution panel of claim 13, wherein the metal busbar is further configured to directly interconnect with each of the input connections of the plurality of fuse holders.

15. The low-resistance telecommunications power distribution panel of claim 14, wherein the metal busbar is directly interconnected with each input connection of each fuse holder via a connector tab, each connector tab having a first end directly fastened to the metal busbar and a second end opposite the first end soldered to the input connection.

16. The low-resistance telecommunications power distribution panel of claim 14, wherein the metal busbar is directly interconnected with each input connection of each fuse holder via a plurality of connector tabs formed integral with the metal busbar, each connector tab having a distal end directly fastened to a quick disconnect mechanism connected to each input connection.

17. The low-resistance telecommunications power distribution panel of claim 13, wherein the direct connection of the metal busbar and the power input lug defines a resistance path consisting of the power input lug directly connected to the metal busbar.

18. The low-resistance telecommunications power distribution panel of claim 13, wherein a direct connection of the metal strip and the power output lug defines a resistance path consisting of the power output lug directly connected to the metal strip.

19. The low-resistance telecommunications power distribution panel of claim 13, further comprising an isolation member coupled with the metal return busbar.

20. A method comprising:
connecting a single unitary metal busbar arranged from a first portion to a second portion opposite the first portion of a low-resistance telecommunications power distribution panel to a power input lug disposed proximate to the second portion, the connection of the single unitary metal busbar and the power input lug defining a resistance path consisting of the power input lug directly connected to the single unitary metal busbar;
connecting a single unitary metal strip arranged from the first portion to the second portion opposite the first portion to a power output lug disposed proximate to the second portion, the connection of the single unitary metal strip and the power output lug defining a resistance path consisting of the power output lug directly connected to the single unitary metal strip; and
connecting a single unitary metal return busbar arranged on the second portion to a return output lug and a return input lug, the connection of the single unitary metal return busbar to the return output lug and the return input lug defining a resistance path consisting of the return output lug and the return input lug directly connected to the single unitary metal return busbar.

21. The method of claim 20, further comprising:
electrically coupling a fuse with the single unitary metal busbar and the single unitary metal strip, wherein the electrical coupling comprises an electrical circuit comprising the fuse electrically coupled with a fuse holder arranged in the first portion of the low-resistance telecommunications power distribution panel, the fuse holder having an input connection and an output connection, and wherein the single unitary busbar is interconnected with the input connection and the single unitary metal strip is directly connected to the output connection.

* * * * *